(12) United States Patent
Kim (10) Patent No.: US 10,368,299 B2
(45) Date of Patent: Jul. 30, 2019

(54) METHOD AND APPARATUS FOR CONTROLLING RADIO FREQUENCY INTEGRATED CHIP IN WIRELESS COMMUNICATION SYSTEM

(71) Applicant: Samsung Electronics Co., Ltd., Suwon-si, Gyeonggi-do (KR)

(72) Inventor: Chan-Young Kim, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 14/587,337

(22) Filed: Dec. 31, 2014

(65) Prior Publication Data

US 2015/0195700 A1 Jul. 9, 2015

(30) Foreign Application Priority Data

Jan. 3, 2014 (KR) .................. 10-2014-0000772

(51) Int. Cl.
| | | |
|---|---|---|
| H04W 8/00 | (2009.01) | |
| H04W 24/00 | (2009.01) | |
| H04L 7/00 | (2006.01) | |
| H04W 4/00 | (2018.01) | |
| H04W 48/16 | (2009.01) | |

(52) U.S. Cl.
CPC ............. *H04W 48/16* (2013.01); *H04W 4/00* (2013.01)

(58) Field of Classification Search
CPC ............. H04W 36/00; H04W 36/0016; H04W 36/0061; H04W 36/16; H04W 8/005; H04W 48/16; H04W 8/00; H04W 84/042; H04W 8/042; H04W 4/00; H03L 7/00; H03L 7/04; H03L 7/08; H04L 25/02; H04L 29/10; H04L 7/00; H04B 1/38
See application file for complete search history.

(56) References Cited

U.S. PATENT DOCUMENTS

| | | | |
|---|---|---|---|
| 8,880,096 B2 * | 11/2014 | Rousu ................. | G01S 19/235 455/456.1 |
| 8,964,791 B2 * | 2/2015 | Vu ....................... | H04L 1/0008 370/504 |
| 2008/0144748 A1 | 6/2008 | Hurley et al. | |
| 2010/0135275 A1 * | 6/2010 | Storm .................. | H04B 1/406 370/349 |
| 2011/0122829 A1 * | 5/2011 | Zetterman ......... | H04W 72/1215 370/329 |
| 2012/0224518 A1 * | 9/2012 | Padmanabhan ... | H04W 56/0045 370/311 |
| 2013/0176941 A1 * | 7/2013 | Swarts ................ | H04J 11/0073 370/328 |
| 2014/0010317 A1 * | 1/2014 | Oshikiri ............. | H04L 7/0012 375/259 |
| 2014/0126615 A1 * | 5/2014 | Agami ................ | H04J 3/0685 375/222 |

(Continued)

*Primary Examiner* — Khawar Iqbal
(74) *Attorney, Agent, or Firm* — Jefferson IP Law, LLP (57) ABSTRACT

A method and apparatus for controlling a Radio Frequency Integrated Chip (RFIC) in a wireless communication system are provided. The method includes detecting an event for changing a signal receiving cell of the RFIC, determining whether a Serial Peripheral Interface (SPI) control command for a target cell is pre-stored based on information of the target cell, and configuring the RFIC based on the pre-stored SPI control command if the SPI control command for the target cell is pre-stored.

16 Claims, 3 Drawing Sheets

(56) References Cited

U.S. PATENT DOCUMENTS

| | | | | |
|---|---|---|---|---|
| 2014/0141799 A1* | 5/2014 | Rousu | ............... | G01S 19/235 455/456.1 |
| 2015/0010113 A1* | 1/2015 | Igarashi | ............ | H04L 27/0002 375/327 |
| 2015/0024696 A1* | 1/2015 | Jin | .................. | H04B 1/0458 455/77 |
| 2015/0189575 A1* | 7/2015 | Arora | ............... | H04W 84/042 455/434 |
| 2015/0257098 A1* | 9/2015 | Yu | ..................... | H04W 24/08 370/311 |
| 2016/0156458 A1* | 6/2016 | Babitch | ............ | H04W 56/001 370/503 |

* cited by examiner

METHOD AND APPARATUS FOR CONTROLLING RADIO FREQUENCY INTEGRATED CHIP IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 3, 2014 in the Korean Intellectual Property Office and assigned Serial number 10-2014-0000772, the entire disclosure of which is hereby incorporated by reference.

TECHNICAL FIELD

The present disclosure relates to a Radio Frequency Integrated Chip (RFIC) control in a wireless communication system.

BACKGROUND

In a wireless communication system, a mobile communication terminal which supports a multi-mode and a multi-band periodically performs a neighboring cell discovery and measurement to support a mobility of the terminal. For example, the mobile communication terminal may perform a neighboring cell discovery and measurement for a handover and a cell reselection on communication systems which are different in type from a currently accessed communication system in preparation for a situation where a cell environment is changeable by a movement of the terminal, and may perform the neighboring cell discovery and measurement for the handover and the cell reselection in the same communication system.

That is, the mobile communication terminal may perform the neighboring cell discovery and measurement in every pre-set specific duration while communicating with a serving base station. For example, in order for the mobile communication terminal to perform a neighboring cell discovery and measurement, a gap duration for the neighboring cell discovery may be allocated from the serving base station, and thereafter a radio link with the serving base station may be disconnected during the gap duration to discover and measure neighboring cells. For such an operation, the mobile communication terminal must periodically change a mode of a Radio Frequency Integrated Chip (RFIC). For example, the mobile communication terminal may discover and measure the neighboring cells during the gap duration by changing the mode of the RFIC from a serving cell mode for receiving a signal of a serving cell to a neighboring cell mode for receiving a signal of a neighboring cell. In addition, by changing the mode of the RFIC from the neighboring cell mode back to the serving cell mode before the gap duration ends, the mobile communication terminal may communicate with the serving cell after the gap duration ends.

As described above, it is necessary to periodically discover and measure the neighboring cells in order to ensure a mobility in the mobile communication terminal. For this, a periodic RFIC mode transition is necessary. A time for discovering and measuring the neighboring cells in the gap duration is decreased when a time required for the RFIC mode transition in the mobile communication terminal is increased, which may lead to a deterioration of a neighboring cell discovery capability. In addition, a transition from the neighboring cell mode to the serving cell mode is delayed when a time required for the RFIC mode transition in the mobile communication terminal is increased, which may lead to a capability deterioration in the serving cell. Accordingly, there is a need to provide a method for decreasing the RFIC mode transmission in the mobile communication terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for decreasing a mode transition time of a Radio Frequency Integrated Chip (RFIC) of a mobile communication terminal in a wireless communication system.

Another aspect of the present disclosure is to provide a method and apparatus for decreasing a mode transition time of an RFIC by minimizing a time required to generate a Serial Peripheral Interface (SPI) control command for a mode transition of the RFIC in a mobile communication terminal.

Another aspect of the present disclosure is to provide a method and apparatus for storing an SPI control command based on information regarding a target cell in a mobile communication terminal and thereafter controlling a mode transition of an RFIC based on the pre-stored SPI control command.

Another aspect of the present disclosure is to provide a method and apparatus for storing an SPI control command for an RFIC mode transition based on at least one of a frequency and an RAT in a mobile communication terminal.

In accordance with an aspect of the present disclosure, a method of controlling an RFIC in a wireless communication terminal is provided. The method includes detecting an event for changing a signal receiving cell of the RFIC, determining whether an SPI control command for a target cell is pre-stored based on information of the target cell, and configuring the RFIC based on the pre-stored SPI control command if the SPI control command for the target cell is pre-stored.

In accordance with another aspect of the present disclosure, an apparatus for controlling an RFIC in a wireless communication terminal is provided. The apparatus includes the RFIC configured to process a Radio Frequency (RF) signal, an SPI manager configured to detect an event for changing a signal receiving cell of the RFIC, and to determine whether an SPI control command for a target cell is pre-stored based on information of the target cell, and a baseband modem configured to configure the RFIC based on the pre-stored SPI control command if the SPI control command for the target cell is pre-stored.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure described hereinafter relates to a method and apparatus for decreasing a mode transition time of a Radio Frequency Integrated Chip (RFIC) by minimizing a time required to generate a Serial Peripheral Interface (SPI) control command for a mode transition of the RFIC in a mobile communication terminal. It is assumed hereinafter that the mobile communication terminal is a terminal which supports a multi-mode and a multi-band.

The mobile communication terminal must periodically discover and measure neighboring cells to ensure a mobility of the terminal. In this case, a serving cell and a neighboring cell of the mobile communication terminal may support the same Radio Access Technology (RAT) or may support different RATs. In addition, the serving cell and the neighboring cell may support the same frequency band or may support different frequency bands. In general, in order for the mobile communication terminal to discover a neighboring cell which supports an RAT and/or a frequency different from those of a currently accessed serving cell, a mode transition of the RFIC, that is, a change in an RFIC configuration, is necessary. Accordingly, in order to periodically discover and measure the neighboring cell in a state where the mobile communication terminal is currently accessed to a serving cell, a periodical mode transition of the RFIC is necessary. For example, the mobile communication terminal may perform a mode transition of the RFIC from a serving cell mode for communicating with the serving cell to a neighboring cell mode for measuring a specific neighboring cell, and may perform the mode transition from the neighboring cell mode back to the serving cell mode. In particular, there is a high possibility that neighboring cells which are measurement targets are maintained without alternation until the mobile communication terminal performs a handover to the specific neighboring cell, and thus several RFIC modes may be used through a repetitive transition until the mobile communication terminal performs the handover to the specific neighboring cell.

Accordingly, the present disclosure proposes a method of decreasing a time required for an RFIC mode transition by considering a characteristic in which an RFIC mode for transmitting/receiving a signal for a specific cell is repetitively used in a mobile communication terminal and the same SPI control command is used for an RFIC mode transition (or configuration). That is, according to an embodiment of the present disclosure, a method is described in which, instead of generating the SPI control command for the RFIC mode transition all the time, the SPI control command is generated only in a case where the RIFC mode transition is required initially for each cell, the generated SPI control command is stored, the generated SPI control command is stored, and thereafter if the RFIC mode transition is required next time for each cell, a previously stored SPI control command is used. Since the previously stored SPI control command is used instead of generating the SPI control command whenever the RFIC mode transmission is necessary, the present disclosure described below may decrease an RFIC mode transition time by saving a time required to generate the SPI control command.

Figure 1:
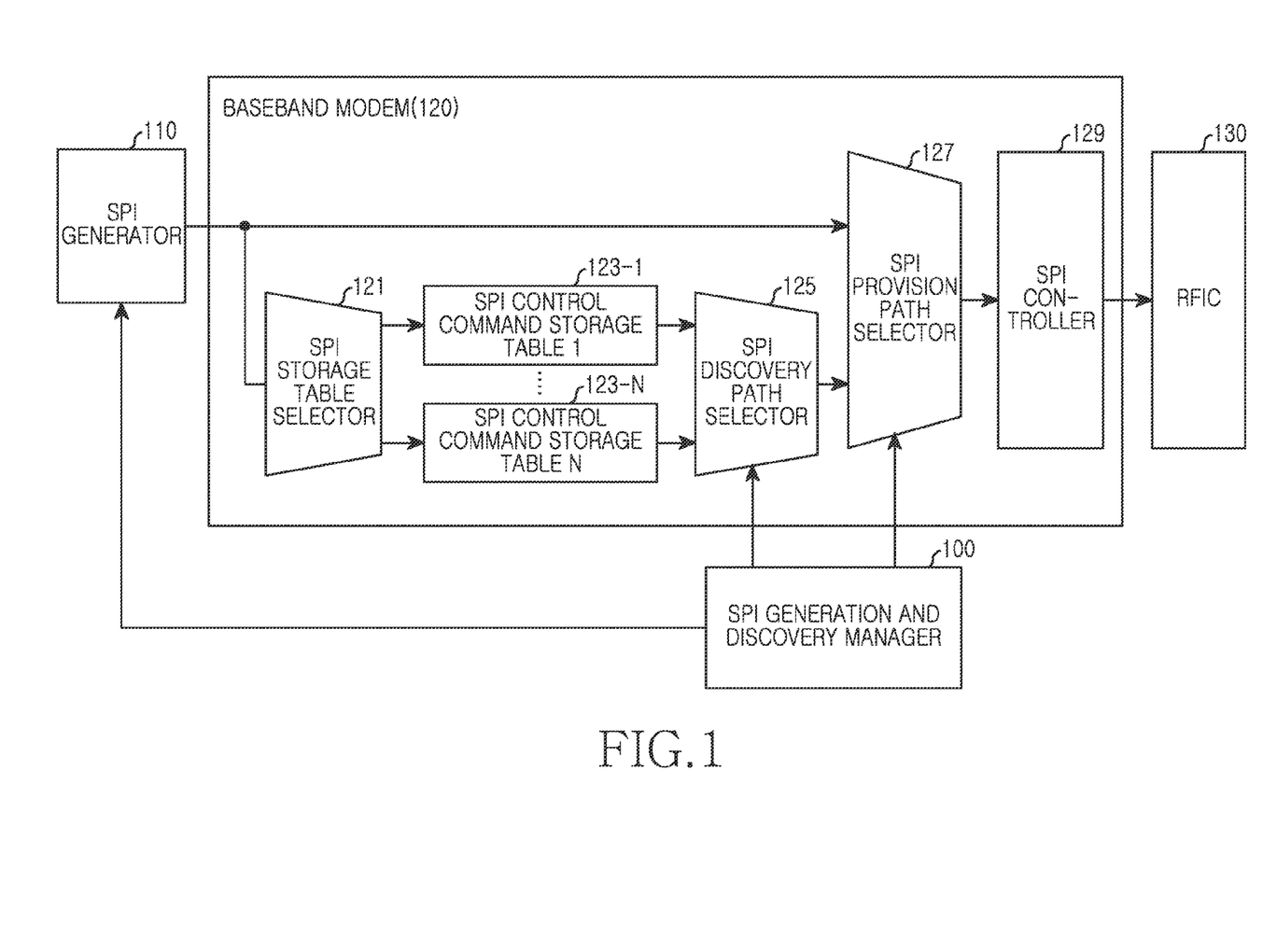
FIG. 1 is a block diagram of a mobile communication terminal according to an embodiment of the present disclosure.

FIG. 1 is a block diagram of a mobile communication terminal according to an embodiment of the present disclosure.

Referring to FIG. 1, the mobile communication terminal may include an SPI generation and discovery manager 100, an SPI generator 110, a baseband modem 120, and an RFIC 130.

The SPI generation and discovery manager 100 detects a situation of requiring a configuration control of the RFIC 130 in the mobile terminal. The SPI generation and discovery manager 100 may detect the situation of requiring the configuration control for a mode transition of the RFIC 130 when there is a change in a target cell which intends to receive a signal. For example, when in a pre-set duration (e.g., a gap duration) for performing a neighboring cell discovery and measurement in a state where a serving cell is currently accessed, the SPI generation and discovery manager 100 may detect that it is the situation of requiring the configuration control of the RFIC 130 to achieve an RFIC mode transition from a serving cell mode to a neighboring cell mode. For another example, the SPI generation and discovery manager 100 may detect that it is the situation of requiring the configuration control of the RFIC 130 to achieve the RFIC mode transition from the neighboring cell mode to the serving cell mode before the pre-set duration ends in a state where the neighboring cells are currently discovered and measured.

Upon detecting the situation of requiring the configuration control of the RFIC 130, the SPI generation and discovery manager 100 examines whether an SPI control command is pre-stored on the basis of information of a target cell for a configuration of the RFIC 130. Herein, the target cell implies a cell for receiving a signal from the RFIC 130. The target cell may be a serving cell or a neighboring cell according to a situation. In addition, the information of the target cell may include at least one of frequency information, RAT information, and cell IDentifier (ID) information. For example, upon detecting the situation of requiring the configuration control of the RFIC 130 to measure a signal of a specific neighboring cell in a state of currently accessing a serving cell, the SPI generation and discovery manager 100 examines whether an SPI control command corresponding to information of the specific neighboring cell which is a target cell is pre-stored. For example, if a frequency used in the target cell is f1, it is examined whether an SPI control command corresponding to f1 is pre-stored. For another example, if the target cell is a cell which supports a first RAT, it is examined whether an SPI control command corresponding to the first RAT is pre-stored. For another example, if the target cell supports a second RAT and uses a frequency f2, it is examined whether an SPI control command corresponding to the second RAT and f2 is pre-stored.

The SPI generation and discovery manager 100 may store and manage target cell information and index information of an SPI control command storage table for storing a corresponding SPI control command by receiving the information from the baseband modem 120, and may determine whether an SPI control command corresponding to the information of the target cell is pre-stored on the basis of the target cell information and table index information previously received from the baseband modem 120.

If the SPI control command corresponding to the information of the target cell is not pre-stored, the SPI generation and discovery manager 100 may provide the information of the target cell to the SPI generator 110, and thus may request to generate an SPI control command for a mode transition of the RFIC 130 to a mode capable of receiving a signal of the target cell. In this case, the SPI generation and discovery manager 100 may output to an SPI provision path selector 127 a control signal for an SPI control command provision path directed to the RFIC 130. For example, the SPI generation and discovery manager 100 may transmit to the SPI provision path selector 127 a control signal to notify from which entity an SPI control command will be provided between the SPI generator 110 and SPI control command storage tables 123-1 to 123-N.

On the other hand, if the SPI control command corresponding to the information of the target cell is pre-stored, the SPI generation and discovery manager 100 may provide an SPI discovery path selector 125 with an index of a table in which the SPI control command is stored. In addition, the SPI generation and discovery manager 100 may output a control signal for the SPI control command provision path to the SPI provision path selector 127. For example, the SPI generation and discovery manager 100 transmits to the SPI provision path selector 127 a control signal to notify from which entity the SPI control command will be provided between the SPI generator 110 and the SPI control command storage tables 123-1 to 123-N.

Additionally, when it is necessary to discover neighboring cells located around the mobile communication terminal, since it is a state where the information for the target cell is not acquired, the SPI generation and discovery manager 100 may provide frequency information and/or RAT information which are discovery targets to the SPI generator 110 according to a pre-set method, and thus may request to generate the SPI control command for the mode transition of the RFIC 130 on the basis of corresponding information.

Additionally, the SPI generation and discovery manager 100 may delete a table which is not used for more than a pre-set time among the plurality of SPI control command storage tables 123-1 to 123-N stored in the baseband modem 120.

The SPI generator 110 generates an SPI control command for controlling a configuration of at least one composition element included in the RFIC 130 according to a pre-set method on the basis of information received from the SPI generation and discovery manager 100. The SPI control command may include address information for controlling a composition element of the RFIC 130 and configuration information regarding at least one composition element included in the RFIC 130. Herein, the configuration information regarding the at least one composition element included in the RFIC 130 may be divided into configuration information regarding a composition element of a transmission path and configuration information regarding a composition element of a reception path. When the SPI control command is generated, the SPI generator 110 outputs the generated SPI control command to the RFIC 130 via the baseband modem 120.

The baseband modem 120 may control a configuration for the mode transition of the RFIC 130 by using the SPI control command which is output from the SPI generator 110 according to a signal which is output from the SPI generation and discovery manager 100, and may control the configuration for the mode transition of the RFIC 130 by discovering the SPI control command from the SPI control command storage tables 123-1 to 123-N pre-stored in the baseband modem 120.

The baseband modem 120 includes an SPI storage table selector 121, the plurality of SPI control command storage tables 123-1 to 123-N, the SPI discovery path selector 125, the SPI provision path selector 127, and the SPI controller 129.

The SPI storage table selector 121 receives the target cell information and the SPI control command from the SPI generator, designates an SPI control command storage table for storing the received target cell information and SPI control command, and stores the received target cell information and SPI control command into the designated SPI control command storage table. According to an embodiment of the present disclosure, the SPI storage table selector 121 may generate the SPI control command storage table, and may store the received target cell information and SPI control command into the generated SPI control command storage table. The SPI storage table selector 121 may provide the SPI generation and discovery manager 100 with index information of the SPI control command storage table in which the target cell information and the SPI control command are stored. For example, if information of a first target cell and an SPI control command corresponding to the first target cell are stored in the first SPI control command storage table 123-1, the SPI storage table selector 121 outputs to the SPI generation and discovery manager 100 a signal which indicates that the information of the first target cell is stored in the SPI control command storage table 123-1 having an index 1.

Each of the plurality of SPI control command storage tables 123-1 to 123-N stores target cell information including at least one of frequency information, RAT information, and ID information, and an SPI control command in association with corresponding information. For example, the first SPI control command storage table 123-1 may store information of a serving cell of the mobile communication terminal and an SPI control command corresponding to the serving cell information, may store information of a first neighboring cell discovered by the mobile communication terminal and an SPI control command corresponding to the first neighboring cell information, and may store information of a second neighboring cell and an SPI control command corresponding to the second neighboring cell information. In addition, each of the plurality of SPI control command storage tables 123-1 to 123-N may store an SPI control command for a cell discovery for each frequency and each RAT. For example, when the cell discovery is performed by using a first frequency as to a first RAT, the fourth SPI control command storage table 123-4 may store the first RAT and the first frequency and an SPI control information corresponding thereto. In addition, when the cell discovery is performed by using a second frequency as to a second RAT, the fifth SPI control command storage table 123-5 may store the second RAT and the second frequency and an SPI control information corresponding thereto.

The SPI discovery path selector 125 extracts an SPI control command from any one of the plurality of SPI control command storage tables 123-1 to 123-N under the control of the SPI generation and discovery manager 100, and provides the SPI control command to the SPI provision path selector 127. For example, the SPI discovery path selector 125 receives index information of a table in which an SPI control command corresponding to information of a target cell is stored from the SPI generation and discovery manager 100, extracts the SPI control command from the SPI control command storage table in association with a corresponding index, and provides the SPI control command to the SPI provision path selector 127.

The SPI provision path selector 127 may receive the SPI control command from the SPI generator 110 under the control of a control signal which is input from the SPI generation and discovery manager 100, or may receive the SPI control command from a specific SPI control command storage table 123 via the SPI discovery path selector 125. The SPI provision path selector 127 provides the SPI controller 129 with the SPI control command received from the SPI generator 110 or the specific SPI control command storage table 123.

The SPI controller 129 controls a configuration of at least one composition element included in the RFIC 130 on the basis of the SPI control command provided from the SPI provision path selector 127. For example, if the SPI control command includes gain control information of a Low Noise Amplifier (LNA), the SPI controller 129 may control a function for configuring a gain value of the LNA included in the RFIC 130 on the basis of the gain control information.

As a module for processing a Radio Frequency (RF) transmission/reception signal for a communication of the mobile communication terminal, the RFIC 130 transmits and/or receives a signal of the target cell through a mode transition under the control of the SPI controller 129. For example, the RFIC 130 may transmit/receive a signal with respect to a serving cell by transitioning to a serving cell mode under the control of the SPI controller 129, and may receive a signal for a specific neighboring cell by transitioning to a neighboring cell mode during a pre-set duration (e.g. a gap duration).

Figure 2:
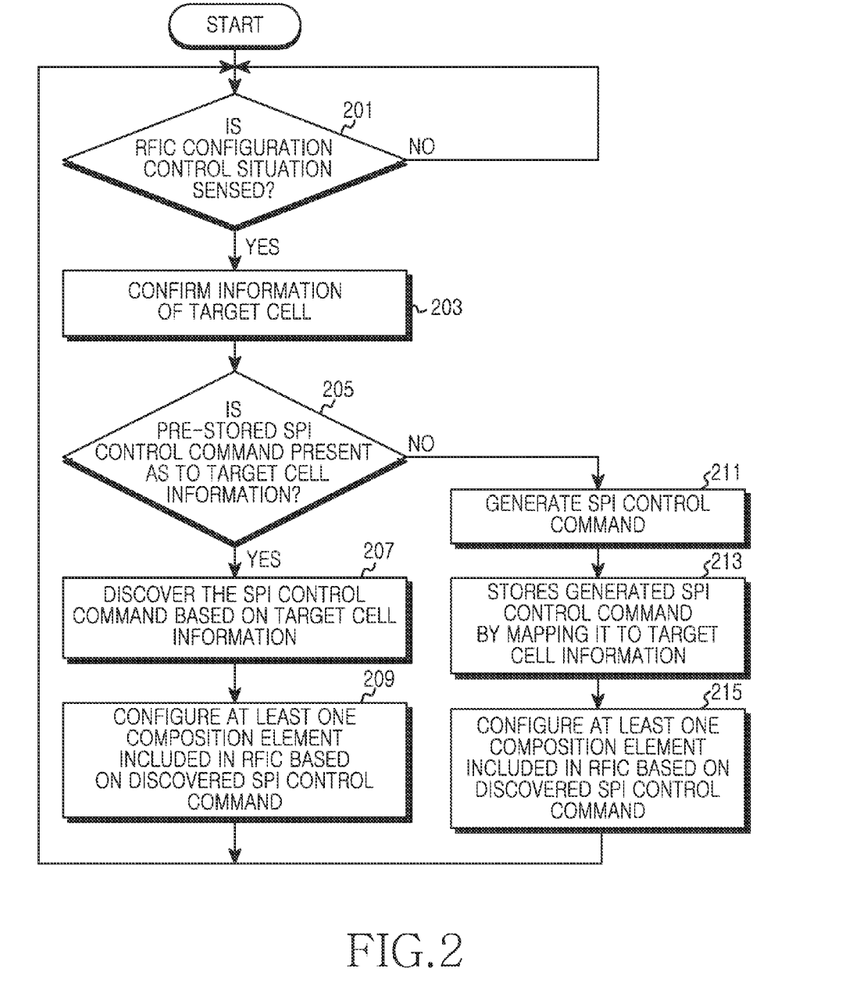
FIG. 2 illustrates a procedure of transitioning a Radio Frequency Integrated Chip (RFIC) mode of a mobile communication terminal according to an embodiment of the present disclosure.

FIG. 2 illustrates a procedure of transitioning an RFIC mode of a mobile communication terminal according to an embodiment of the present disclosure.

Referring to FIG. 2, the mobile communication terminal examines whether a situation of requiring a configuration control of the RFIC 130 is detected in operation 201. That is, the mobile communication terminal examines whether it is a situation of requiring a mode transition of the RFIC 130 to receive a signal of a cell other than a cell in which a signal is currently received. For example, the mobile communication terminal may detect that it is the situation of requiring the configuration control of the RFIC 130 when in a pre-set duration (e.g., a gap duration) in which a neighboring cell discovery and measurement is performed in a state of accessing the serving cell. For another example, the mobile communication terminal may detect that it is the situation of requiring the configuration control of the RFIC 130 before the pre-set duration ends in a state where the neighboring cells are currently discovered and/or measured.

Upon detecting the situation of requiring the configuration control of the RFIC 130, the mobile communication terminal confirms information of a target cell in operation 203. Herein, the target cell implies a cell for receiving a signal in the RFIC 130, and may be a serving cell or a neighboring cell according to a situation. In addition, the information of the target cell may include at least one of frequency information, RAT information, and cell ID information. For example, the mobile communication terminal may confirm information of a specific neighboring cell which is a target for receiving a signal during a pre-set gap duration upon detecting the situation of requiring the configuration control of the RFIC 130 to measure the signal of the specific neighboring cell in a state of accessing the serving cell.

Upon confirming the information of the target cell, in operation 205, the mobile communication terminal examines whether a pre-stored SPI control command is present as to the information of the target cell. For example, if the information of the target cell is a first RAT and a first frequency, it is determined whether an SPI control command corresponding to the first RAT and the first frequency is pre-stored. Herein, the mobile communication terminal may separately store and manage the target cell information and information (e.g., an index) of a table, in which the SPI control command is stored, whenever the SPI control command is generated and stored, and thus may determine whether the pre-set SPI control command is present as to the target cell information.

If the pre-stored SPI control command is present as to the information of the target cell in operation 205, the mobile communication terminal discovers the SPI control command on the basis of the information of the target cell in operation 207. For example, the mobile communication terminal may extract the SPI control command from a corresponding SPI control command storage table on the basis of table information which indicates a table in which the SPI control command corresponding to the information of the target cell is stored.

Thereafter, the mobile communication terminal configures at least one composition element included in the RFIC 130 on the basis of the discovered SPI control command in operation 209. For example, if the SPI control command includes gain control information of an LNA, the mobile communication terminal may configure a gain value of the LNA included in the RFIC 130 on the basis of gain control information. The mobile communication terminal may transmit/receive a signal of the target cell via the RFIC 130 by configuring at least one composition element included in the RFIC 130 on the basis of the SPI control command. Thereafter, returning to operation 201, the mobile communication terminal repeats the subsequent steps.

Otherwise, if the pre-stored SPI control command is not present as to the information of the target cell in operation 205, the mobile communication terminal generates an SPI control command according to a pre-set method on the basis of the information of the target cell in operation 211. Thereafter, proceeding to operation 213, the mobile communication terminal maps and stores the generated SPI control command and the target cell information. In this case, the mobile communication terminal may separately store and manage information (i.e., an index) of a table in which the target cell information and the SPI control command are stored.

Thereafter, in operation 215, the mobile communication terminal configures at least one composition element included in the RFIC 130 on the basis of the discovered SPI control command. For example, if the SPI control command includes frequency information for a band-pass filter, the mobile communication terminal may configure a pass frequency band of the band-pass filter included in the RFIC 130 on the basis of band frequency information. The mobile communication terminal may transmit/receive a signal of the target cell via the RFIC 130 by configuring at least one composition element included in the RFIC 130 on the basis of the SPI control command. Thereafter, returning to operation 201, the mobile communication terminal repeats the subsequent steps.

Figure 3:
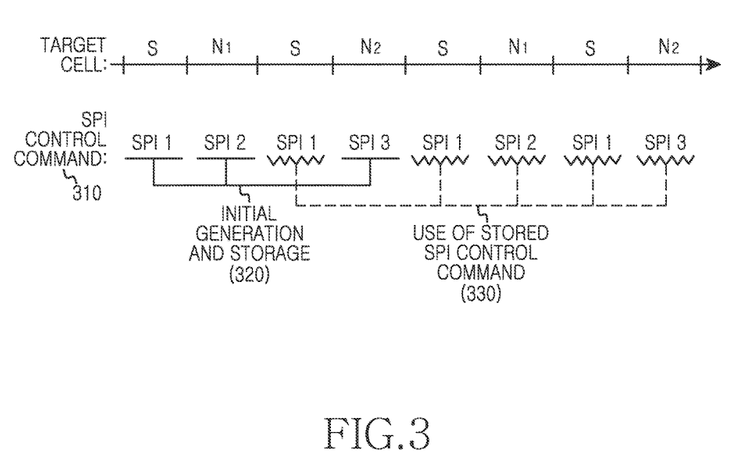
FIG. 3 illustrates a Serial Peripheral Interface (SPI) control command for an RFIC mode transition of a mobile communication terminal according to an embodiment of the present disclosure.

FIG. 3 illustrates an SPI control command for an RFIC mode transition of a mobile communication terminal according to an embodiment of the present disclosure.

Referring to FIG. 3a situation where a cell measurement is periodically performed on a first neighboring cell N1 and a second neighboring cell N2 in each pre-set duration is assumed in FIG. 3 in a situation where the mobile communication terminal currently accesses a serving cell S. In this case, the RFIC 130 of the mobile communication terminal periodically transitions to a mode for receiving a signal for any one cell among three cells.

According to the method of the related art, the mobile communication terminal must generate the SPI control command 310 in each mode transition of the RFIC 130. On the other hand, according to an embodiment of the present disclosure, the mobile communication terminal generates and stores the SPI control command 310 only in an initial mode transition for receiving a signal for each of the serving cell S, the first neighboring cell N1, and the second neighboring cell N2 (see 320), and uses the pre-stored SPI control command in a next mode transition (see 330). For example, the mobile communication terminal may generate an SPI control command SPI1 for the serving cell S in an initial mode configuration for receiving a signal of the serving cell S and store the SPI control command SPI1 by mapping the serving cell S and the SPI1, and may communicate with the serving cell S by configuring the RFIC mode to a serving cell mode on the basis of the SPI1. Thereafter, the mobile communication terminal may detect that it is necessary to measure a signal for the neighboring cell N1 while communicating with the serving cell S. In this case, the mobile communication terminal may detect that the mode configuration for the neighboring cell N1 initially occurs, may generate an SPI control command SPI2 for the neighboring cell N1 and store the SPI control command SPI2 by mapping the neighboring cell N1 and the SPI2, and may measure a signal from the neighboring cell N1 by transitioning the RFIC mode to a first neighboring cell mode on the basis of the SPI2. Thereafter, the mobile communication terminal may detect that the transition back to the serving cell mode is necessary, and may transition the RFIC mode to a serving cell mode by using the SPI1 previously stored by being mapped to the serving cell S. Thereafter, the mobile communication terminal may detect that it is necessary to measure a signal for the neighboring cell N2 while communicating with the serving cell S. The mobile communication terminal may detect that the mode configuration for the neighboring cell N2 initially occurs, may generate an SPI control command SPI3 for the neighboring cell N2 and store the SPI control command SPI3 by mapping the neighboring cell N2 and the SPI3, and may measure a signal from the neighboring cell N2 by transitioning the RFIC mode to a second neighboring cell mode on the basis of the SPI3. Thereafter, the mobile communication terminal may detect that the transition back to the serving cell mode is necessary, and may transition the RFIC mode to a serving cell mode by using the SPI1 previously stored by being mapped to the serving cell S. Thereafter, the mobile communication terminal may detect that it is necessary to measure a signal for the neighboring cell N1 while communicating with the serving cell S, and may transition the RFIC mode to a first neighboring cell mode by using the SPI2 previously stored by being mapped to the neighboring cell N1.

As described above, according to an embodiment of the present disclosure, when an SPI control command for a specific cell is generated, the generated SPI control command is stored, and if a signal reception for the cell is required at a later time, an RFIC mode is transitioned or configured by using the pre-stored SPI control command. Therefore, a time required to generate the SPI control command may be saved. Accordingly, there is an advantage in that an RFIC mode transition time may be decreased.

According to the present disclosure, an SPI control command used for an RFIC mode transition is stored for each frequency and/or for each RAT on the basis of information regarding a target cell in a mobile communication terminal, and upon detecting a situation where the RFIC mode transition is required, a mode of an RFIC is transitioned on the basis of the pre-stored SPI control command, and thus an operation of repetitively generating the same SPI control command is skipped, thereby being able to decrease a time required for the RFIC mode transition. Accordingly, a neighboring cell discovery and measurement time duration in a gap duration is increased, thereby being able to improve a neighboring cell discovery and measurement capability. In addition, a time required for the RFIC mode transition to a serving cell mode after the gap duration is decreased, thereby being able to avoid a capability deterioration of a serving cell after the gap duration.

Operations according to various embodiments of the present disclosure may be implemented by using a single controller. In this case, a program instruction for performing an operation implemented with various computers may be recorded in a computer readable recording medium. The computer readable recording medium may include a program instruction, a data file, a data structure, and the like, in an independent or combined manner. The program instruction may be designed and configured particularly for the present disclosure, or may be known and usable to those ordinarily skilled in the art. The computer readable recording medium may be a hardware device configured particularly to store and perform a program instruction, for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, and the like.

An example of the program instruction includes not only a machine language created by a compiler but also a high-level language executable by a computer by using an interpreter or the like. When a base station or a relay described in the present disclosure is entirely or partially implemented with a computer program, a computer readable recording medium which stores the computer program is also included in the present. Therefore, the scope of the disclosure is defined not by the detailed description of the disclosure but by the appended claims, and all differences within the scope will be construed as being included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a radio frequency integrated chip (RFIC) of a terminal in a wireless communication system, the method comprising:
    detecting an event for changing a mode of the RFIC from a first mode for receiving a signal from a serving cell to a second mode for receiving a signal from a neighbor cell;
    generating a control command including a configuration information for a composition element of the RFIC after the event is detected;
    mapping the generated control command to information of the neighbor cell;
    storing the control command and the information of the neighbor cell in a table;
storing an index of the table in which the generated control command and the information of the neighbor cell are stored;
    in response to detecting a next event for changing the mode of the RFIC to receive a signal from the neighbor cell, obtaining the stored control command by using the information of the neighbor cell;
    configuring the RFIC to change the mode of the RFIC from the first mode to the second mode based on the obtained control command; and
    receiving the signal from the neighbor cell by using the configured RFIC, wherein the second mode corresponds to a frequency or a radio access technology (RAT) for the neighbor cell,
    wherein the event is detected between a start time point of a predetermined duration for measuring the signal from the neighbor cell and an end time point of the predetermined duration,
    wherein the control command corresponds to a serial peripheral interface (SPI) control command, and
    wherein the SPI control command comprises at least one of address information of the RFIC, configuration information regarding a composition element of at least one transmission path of the RFIC, or a composition element of at least one reception path of the RFIC.

2. The method of claim 1, wherein the information of the neighbor cell comprises at least one of frequency information, radio access technology (RAT) information, or a cell identifier (ID).

3. The method of claim 1, further comprising:
    determining a value for the composition element of the RFIC based on the generated control command; and
    configuring the RFIC by controlling a configuration of the composition element of the RFIC based on the value.

4. The method of claim 3, further comprising:
    identifying information of the neighbor cell after the event is detected; and
    generating the control command for the RFIC based on the identified information of the neighbor cell.

5. The method of claim 4, wherein the obtaining of the stored control command for the RFIC comprises obtaining the stored control command for the RFIC without generating the control command to reduce a time required for changing the mode of the RFIC.

6. The method of claim 5, wherein the value for the composition element of the RFIC comprises at least one of a gain value of a low noise amplifier (LNA) in the RFIC or a pass frequency band of a band-pass filter in the RFIC.

7. The method of claim 1,
    wherein the predetermined duration corresponds to a gap duration, and
    wherein the neighbor cell is discovered and measured by the terminal in the gap duration.

8. A non-transitory computer-readable storage medium storing instructions that, when executed, cause at least one processor to perform the method of claim 4.

9. An apparatus of a terminal in a wireless communication system, the apparatus comprising:
    a radio frequency integrated chip (RFIC);
    a manager; and
    a baseband modem,
    wherein the manager is configured to:
    detect an event for changing a mode of the RFIC from a first mode for receiving a signal from a serving cell to a second mode for receiving a signal from a neighbor cell, and
    generate a control command including a configuration information for a composition element of the RFIC after the event is detected,
    wherein the baseband modem is configured to:
    map the generated control command to information of the neighbor cell,
    store the control command and the information of the neighbor cell in a table,
    store an index of the table in which the generated control command and the information of the neighbor cell are stored,
    in response to detecting a next event for changing the mode of the RFIC to receive a signal from the neighbor cell, obtain the stored control command by using the information of the neighbor cell, and
    configure the RFIC to change the mode of the RFIC from the first mode to the second mode based on the obtained control command,
    wherein the RFIC is configured to receive the signal from the neighbor cell by using the configured RFIC,
    wherein the second mode corresponds to a frequency or a radio access technology (RAT) for the neighbor cell,
    wherein the event is detected between a start time point of a predetermined duration for measuring the signal from the neighbor cell and an end time point of the predetermined duration,
    wherein the control command corresponds to a serial peripheral interface (SPI) control command, and
    wherein the SPI control command comprises at least one of address information of the RFIC, configuration information regarding a composition element of at least one transmission path of the RFIC, or a composition element of at least one reception path of the RFIC.

10. The apparatus of claim 9, wherein the information of the neighbor cell comprises at least one of frequency information, radio access technology (RAT) information, or a cell identifier (ID).

11. The apparatus of claim 9, wherein the baseband modem is further configured to:
   determine a value for the composition element of the RFIC based on the generated control command, and
   configure the RFIC by controlling a configuration of the composition element of the RFIC based on the value.

12. The apparatus of claim 11, wherein the manager is further configured to:
   identify information of the neighbor cell after the event is detected, and
   generate the control command for the RFIC based on the identified information of the neighbor cell.

13. The apparatus of claim 12, wherein the value for the composition element of the RFIC comprises at least one of a gain value of a low noise amplifier (LNA) in the RFIC or a pass frequency band of a band-pass filter in the RFIC.

14. The apparatus of claim 13, wherein the baseband modem is further configured to obtain the stored control command for the RFIC without generating the control command to reduce a time required for changing the mode of the RFIC.

15. The apparatus of claim 9,
   wherein the predetermined duration corresponds to a gap duration, and
   wherein the neighbor cell is discovered and measured by the terminal in the gap duration.

16. The apparatus of claim 9, wherein the manager is further configured to delete a table that is not used for a pre-set time among a plurality of control command storage tables in the baseband modem.

* * * * *